July 28, 1942.    A. N. AYERS    2,291,364
CONTROL DEVICE
Filed May 29, 1941
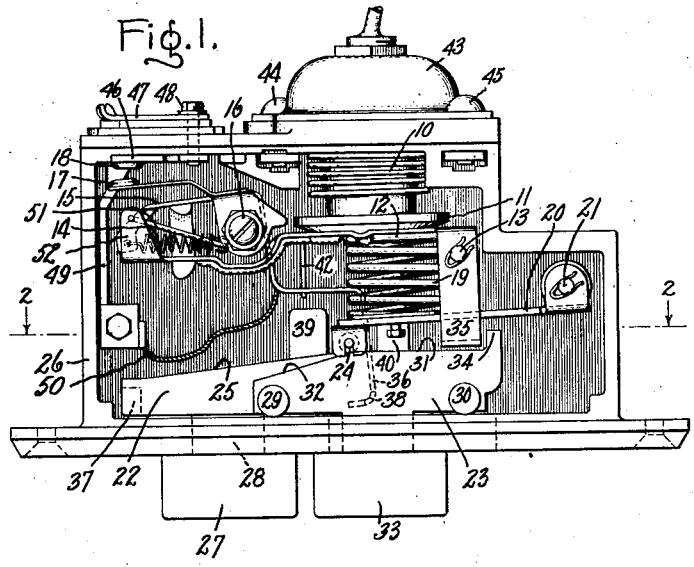
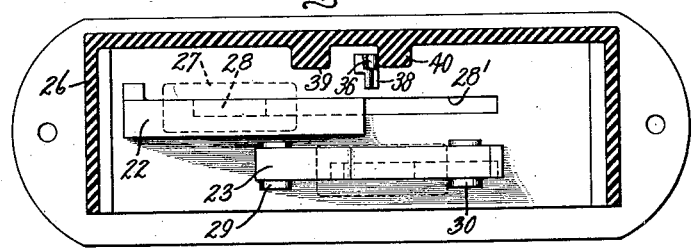
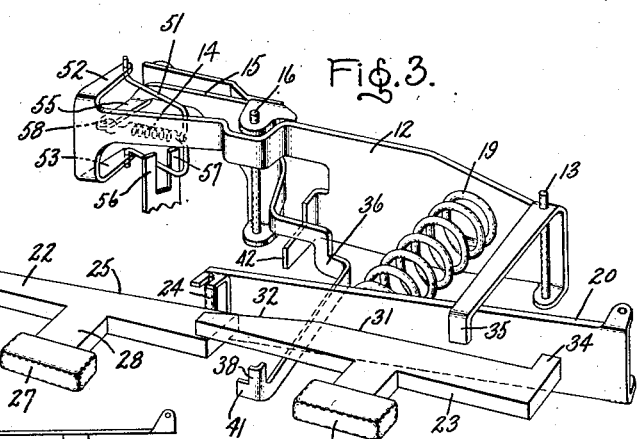
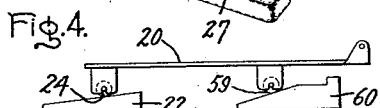
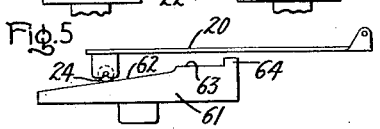
Inventor:
Alan N. Ayers,
by Harry E. Dunham
His Attorney Patented July 28, 1942

2,291,364

UNITED STATES PATENT OFFICE 2,291,364

CONTROL DEVICE

Alan N. Ayers, Scotia, N. Y., assignor to General Electric Company, a corporation of New York Application May 29, 1941, Serial No. 395,741

12 Claims. (Cl. 62—4)

My invention relates to control devices, more particularly to temperature responsive control devices such as used on electrically driven refrigerators, and has for its object a simple, reliable and low cost device of this character having relatively few parts and providing for adjustment of the device to give a high defrost temperature together with means for rendering the defrost adjustment ineffective and providing for the resumption of normal cycling when the driving motor circuit is opened upon the attainment of the defrost temperature.

In carrying out my invention in one form I utilize a temperature responsive operating means of the bellows pressure type together with a spring opposing the bellows device, which spring may be adjusted to regulate the operating characteristics of the control device. For adjustment of the spring I provide a wedge shaped cam member which may be slidably moved for adjustment of the spring to give a desired refrigerator temperature, or in one position to secure the switching means in an open position thereby to shut down the refrigerator as long as the wedge member remains in that position.

I also provide a second wedge or cam member which is slidable to give a single predetermined adjustment of the bellows opposing spring so as to compress the spring and provide for a high defrosting temperature. I also provide an extension or arm on the switching means which engages the second wedge member when the switching means is moved to its open position upon the attainment of the high defrost temperature and thereby moves the second wedge member to an ineffective position. The control device thereafter operates to maintain the refrigerator at the temperature for which the first wedge member is adjusted.

For a more complete understanding of my invention, reference should be had to the accompanying drawing, Fig. 1 of which is a plan view with the top cover removed of a refrigerator control device embodying my invention; Fig. 2 is a sectional view taken along the line 2—2 of Fig. 1 with some of the parts not shown; Fig. 3 is an enlarged view of the operating and adjustment mechanism of the control device shown in Fig. 1; while Figs. 4 and 5 are fragmentary views showing modified forms of my invention.

I have shown my invention in one form as applied to a control device for controlling a domestic electrically driven refrigerator. It will be understood that such devices comprise an electric switch in the circuit of the driving motor for the refrigerator, which switch is actuated by means responsive to the temperature in the refrigerator thereby to maintain a predetermined temperature.

I have shown my invention in one form as applied to a refrigerator control device substantially as described and claimed in United States Patent No. 2,050,883, issued on August 11, 1936, to John B. Ford. The device comprises a temperature responsive operating device 10 shown as a metal fluid pressure bellows device which bears on a disk 11 made of insulating material bearing in turn on a switch operating arm 12 having a stationary pivot 13. The end of the operating arm 12 is connected through an over-center spring 14 to operate a flexible switch arm 15 having a stationary pivot 16. A movable contact 17 is carried on the switch arm, this movable contact cooperating with a stationary contact 18.

A helical compression spring 19 bears on the operating arm 12 on the side opposite the bellows 10 and applies a force to the operating arm in opposition to the force applied by the bellows. My invention relates in particular to simple and reliable means for adjusting as desired the pressure applied by the spring 19.

An adjustment arm 20 is provided having a stationary pivot 21, on which arm bears the end of the spring 19 opposite the end bearing on the arm 12. For adjustment of the arm, and hence adjustment of the force applied by the spring 19 to the arm 12, I provide two wedge shaped members 22 and 23 which engage the movable end of the adjustment arm 20. Preferably, as shown, the end of the arm 20 is provided with a suitable bearing, such as a roller bearing 24, resting on the members 22 and 23.

The wedge shaped member 22 is utilized to effect the normal temperature adjustment of the control device thereby to vary the air temperature in the refrigerator that is maintained. As shown in the drawing, the member 22 is in its extreme lefthand position whereby the arm 20 is lifted, i. e., moved clockwise about its pivot 21, for maximum compression of the spring 19 and hence maximum operating temperature in the refrigerator. From this point of the upper cam surface or edge 25 of the member 22 engaged by the roller bearing 24 the surface 25 is inclined downwardly, as seen in Fig. 1 of the drawing, so that slidable movement of the wedge 22 toward the right hand, as seen in Fig. 1, lowers the left-hand end of the arm 20 thereby to decrease the pressure applied by the spring 19. This causes the switch arm 12 to be moved downward, as seen in Fig. 1, by a lower fluid pressure in the bellows 10 and hence lower temperature in the refrigerator thereby to reengage the contacts 17 and 18 and start the refrigerator motor at a lower temperature. Thus the control device is adjusted to maintain a progressively lower temperature in the refrigerator as the wedge member 22 is moved toward the right hand from the position shown in Fig. 1.

Preferably, the lower edge of the wedge member 22 bears on the adjacent wall of the casing 26 in which the mechanism is mounted, the friction between the two parts being sufficient to secure the wedge member in any adjusted position. For convenience in adjustment a knob 27 is provided on the outside of the casing 26, which knob is secured to the wedge member 22 by means of a rigid connection member 28 extending through a slot 28' provided for it in the casing. Thus, by pushing the knob 27 laterally along the front of the casing, the wedge member 22 is adjusted in a direction at right angles to the axis of the pivot 21 thereby to adjust the temperature being maintained in the refrigerator as desired.

The wedge member 23 is similar in construction to the wedge member 22. It is, however, provided with pairs of rollers 29 and 30 (only one roller of each pair being shown) at opposite ends, which rollers bear on the inner surface of the casing and provide bearings for reduced friction between the wedge member and the casing. This wedge member has a single operating or effective surface 31, which surface is substantially parallel with the inner surface of the casing on which bear the rollers 29 and 30. Also, the bearing member is provided with a relatively steeply inclined bearing surface 32 arranged to engage the roller bearing 24 and forming a continuation of the bearing of the cam surface 31. In a manner similar to the wedge member 22 this wedge member is slidably movable from the exterior of the casing by means of a knob 33.

In the position shown in the drawing the wedge member 23 is in an ineffective position, in which position the roller bearing 24 engages the steeply inclined wedge surface 32. This surface 32 is so steeply inclined that an overrunning action is provided. In other words, the roller bearing 24 has sufficient force applied to it by the spring to move the cam member 23 toward the right hand. As shown in the drawing, the roller bearing is resting on the wedge member 22. If the wedge member 22 is moved toward the right hand, the roller bearing 24 moves downward in engagement with the surface 25, but the engagement of the roller bearing with the inclined surface 32 of the other wedge member forces the wedge member 23 to the right hand out of the way, this wedge member moving freely on its bearings 29 and 30.

For the defrost adjustment, the wedge member 23 is moved toward the left hand to its extreme position by means of the knob 33 whereby the left-hand end of the horizontal surface or edge 31 is moved under the roller bearing 24. Because the surface 31 is horizontal, or more accurately because the spring force applied by the roller bearing to the surface 31 is at right angles with the surface 31 and with the inner surface of the casing on which the bearings 29 and 30 move, there is no force at this time tending to move the wedge member 23 on its bearings and the wedge member consequently remains in this defrost position. If the defrost setting is made when the contact arm 12 is in its closed circuit position, a projection 34 on the wedge member 23 engages an arm 35 secured to the operating arm 12 and extending into the path of the projection 34 and thereby moves the arm 12 clockwise to its open circuit position. Ordinarily, this defrost setting has the effect of compressing the spring 19 somewhat and consequently the switch arm remains in its open circuit position until the refrigerator temperature has increased to such a value that the bellows overcomes the spring 19 and closes the switch contacts to start the refrigerator motor. This spring setting made by the wedge member 23 compresses the spring sufficiently to produce a temperature higher enough in the evaporator of the refrigerator to effect defrost of the evaporator. When the arm 12 is moved counterclockwise from the position shown in Fig. 1 to its closed circuit position, however, the arm 35 engages the projection 34 and moves the wedge member 23 toward the right hand far enough to bring the roller bearing 24 onto the surface 32, thus automatically reestablishing the normal refrigerator operating condition.

Thus it will be observed that the defrost setting causes the refrigerator temperature to rise to a predetermined defrost temperature and when this temperature is reached, the normal operating conditions are reestablished automatically.

Also, while Fig. 1 of the drawing shows the wedge member 22 in its extreme left-hand position for the highest possible refrigerator temperature, ordinarily during operation of the refrigerator, the wedge member 22 will be in a position to the right of that shown, giving a desired low refrigerator temperature.

Another feature of the control is an off or continuously switch open setting which is obtained by moving the wedge member 22 to its extreme right-hand position into engagement with an arm 36 secured to the switch arm 15. More specifically, a laterally extending projection 37 on the wedge member 22 engages a laterally extending projection 38 on the lower end of the arm 36 and moves the contact arm in a counterclockwise direction about the pivot 16, as seen in Fig. 1, to the open circuit position. The friction between the wedge member 22 and the inner surface of the casing 26 is sufficient to hold the wedge member in this off position.

For the purpose of providing limits of movement of the contact arm two projections 39 and 40 are provided on an inner wall of the casing adjacent the lower end of the arm 36, as seen in Fig. 1. These projections are spaced apart a predetermined distance providing for a predetermined range of angular movement of the switch arm 15 as fixed by the movement of the end of the arm 36 between the two projections. The end of the arm 36 is provided with a projection 41 for the purpose of defining and limiting this movement.

Also, the projection 39 acts as a stop for the operating arm 12 in its closed circuit position, an arm 42 on the switch arm engaging the upper end of this projection, as seen in Fig. 1, when the switch arm is moved to its closed circuit position.

Preferably, the casing 26 for mounting and enclosing the various parts is made of a suitable moulded electrically insulating material such as a phenolic condensation product. The bellows 18 is inserted from the exterior of the casing through a hole (not shown) provided for the bellows. It is secured in place by securing a flange 43 to which the bellows is secured to an outer wall of the casing by means of bolts 44 and 45.

As shown, the stationary contact 18 is secured to an electrically conducting strip 46 and is electrically connected to an electric terminal member 47 on the exterior of the casing by means of a screw or rivet 48 which also holds these parts secured to the casing. A similar terminal member (not shown) is provided for the movable contact 17, this terminal member being electrically connected by means of a conducting strip 49 and a flexible conducting lead 50 to the switch arm 15.

It will be understood that the snapping mechanism for the switch arm consists of a U-shaped link 51 having its ends pivoted on a pair of projections 52 and 53 on the end of the switch arm 12. The over-center snapping spring 14 has one end connected to the closed end of the link 51 and its other end connected to an arm 55 secured to the switch arm 15. Suitable electrically insulating stops 56 and 57 are provided for limiting the movement of the link 51 in each of its extreme positions. Thus, movement of the operating arm 12 to bring the pivot axis of the link 51 to one side or the other of the point of connection 58 of the spring with the arm 55 causes the link 51 to snap from one position to another and thereby snap the switch arm 15 between its open and closed circuit positions.

In the modified form shown in Fig. 4 the arm 20 is provided with a second roller bearing 59 intermediate its length. The defrosting cam 60 corresponding to the cam 23 of Figs. 1 to 3 cooperates with this bearing 59. The other cam 22 cooperates as before with the roller bearing 24. This arrangement has the advantage of separating the two operating cams from each other whereby the cam 60 may be shortened if desired.

In the arrangement of Fig. 5 I have provided a single adjustment cam, only this cam being provided with the combined adjustment cam surfaces of the two cams shown in Figs. 1 to 3. In Fig. 5 the single cam 61 has an adjustment surface 62 for giving the normal box temperature adjustment to the arm 20. This surface 62 corresponds with the surface 25 of the cam 22. In addition, the cam 61 has a flat or level surface 63 raised above the surface 62, which surface 63 gives the defrost adjustment. Also, the cam 61 is provided with a projection 64 which is engaged by an arm or projection carried by the operating arm 12 and corresponding with the arm 35 of Figs. 1 to 3 whereby the cam 61 is automatically moved from the defrost setting on the surface 63 to the normal adjustment surface 62 after the completion of a single high temperature defrost cycle.

The arrangements of Fig. 5, while having the advantage of simplicity over the double cam arrangements, has the disadvantage that after the defrost cycle the control device is adjusted to maintain a predetermined high temperature corresponding to the position to which the cam 61 is returned after the defrost cycle. Ordinarily the cam 61 will be moved toward the right hand after the completion of the defrost cycle far enough to permit the roller bearing 24 to engage the surface 62, but probably the roller bearing will be located at the right-hand end of the surface 62. Therefore, if a lower temperature is desired in the refrigerator, the cam 61 must be adjusted manually toward the right hand to some such position as indicated in Fig. 5.

While I have shown a particular embodiment of my invention, it will be understood, of course, that I do not wish to be limited thereto, since many modifications may be made and I, therefore, contemplate by the appended claims to cover any such modifications as fall within the true spirit and scope of my invention.

What I claim as new and desire to secure by Letters Patent of the United States is:

1. A control device comprising an operating member, a temperature responsive device for actuating said member, a spring for applying a force in opposition to said temperature responsive device, cam means mounted for slidable movement from a first position to a second position to vary the force applied by said spring, and means actuated by said operating member for engaging and moving said cam means with said operating member when said operating member is moved by said temperature responsive device in response to a predetermined temperature thereby to return said cam means to said first position.

2. A control device comprising an operating member, a temperature responsive device for actuating said member, a spring for applying a force in opposition to said temperature responsive device, an adjustment member for said spring provided with bearing means, cam means engaging said bearing means mounted for slidable movement from a first position to a second position to vary the compression of said spring for predetermined temperature settings, and means actuated by said operating member for engaging and moving said cam means with said operating member when said operating member is moved by said temperature responsive device in response to a predetermined temperature thereby to return said cam means to said first position.

3. A control device comprising a switch operating member, a temperature responsive device for operating said member, a spring for applying a force in opposition to said temperature responsive device, an adjustment member for said spring provided with bearing means, cam means provided with a plurality of cam faces mounted for slidable movement selectively into engagement with said bearing means thereby to compress said spring for predetermined temperature settings, and means actuated by said operating member for engaging said cam means when said operating member is moved by said temperature responsive device in response to a predetermined temperature thereby to move one of said cam faces to an ineffective position.

4. A control device comprising a switch operating member, a temperature responsive device for operating said member, a spring for applying a force in opposition to said temperature responsive device, an adjustment member for said spring provided with bearing means, cam means engaging said bearing means for securing said adjustment member in one of a plurality of different temperature positions, means for adjusting said cam means between predetermined positional limits thereby to vary the position of said adjustment member between predetermined temperature limits, and an arm on said operating member for engaging said cam means thereby to move said cam means toward the other temperature limit when said operating member is moved by said temperature responsive device in response to a predetermined one of said temperature limits for which said cam means was adjusted.

5. A control device comprising a switch operating member, a temperature responsive device for operating said member, a spring for applying a force in opposition to said temperature responsive device, an adjustment member for said spring provided with bearing means, cam means engaging said bearing means for securing said adjustment member in one of a plurality of different temperature positions, means for adjusting said cam means thereby to vary the position of said adjustment member for a desired temperature position, and means actuated by said operating member for moving said cam means to a lower temperature position when said operating member is moved by said temperature responsive device in response to a predetermined high temperature for which said cam means was adjusted.

6. A refrigerator control device comprising a switch operating member, a temperature responsive device for operating said member, a spring for applying a force in opposition to said temperature responsive device, an adjustment member for said spring provided with a bearing, a cam member mounted for slidable movement from an ineffective position into engagement with said bearing thereby to compress said spring for a predetermined temperature setting, an arm on said switch member for engaging said cam when said operating member is moved by said temperature responsive device in response to said predetermined temperature thereby to move said cam to an ineffective position, and a second cam member engaging said bearing to maintain a different temperature setting when said first cam is in said ineffective position.

7. A refrigerator control device comprising switching means, a pressure temperature responsive device for operating said switching means, an arm having a fixed pivot, an adjusting spring mounted between the end of said arm and said pressure device so as to oppose the movement of said pressure device in response to an increase in temperature, a bearing on the end of said arm, a wedge shaped adjustment member normally engaging said bearing so as to hold said arm in a predetermined position, said wedge shaped member being movable to vary the position of the end of said arm and thereby adjust the temperature at which said switching means is operated, and a projection on said wedge member for securing said switching means in its open position when said wedge member has been moved to its lowest temperature position.

8. A refrigerator control device comprising switching means, a pressure temperature responsive device for operating said switching means, an arm having a fixed pivot, an adjusting spring mounted between the end of said arm and said pressure device so as to oppose the movement of said pressure device in response to an increase in temperature, a bearing on the end of said arm, a wedge shaped member cooperating with said bearing movable to move said arm to a predetermined position thereby to adjust said spring for a predetermined defrost temperature, and an operating arm on said switching means arranged to engage said wedge member and return said wedge member to an ineffective position when said switching means is moved to a closed position by said pressure means in response to said predetermined defrost temperature.

9. A refrigerator control device comprising switching means, a pressure temperature responsive device for operating said switching means, a spring adjustment member, an adjusting spring mounted between said member and said pressure device so as to oppose the movement of said pressure device in response to an increase in temperature, bearing means on said member, a wedge shaped adjustment member normally engaging said bearing means so as to hold said member in a predetermined position, said wedge shaped member being movable to vary the position of said member and thereby adjust the pressure applied by said spring and the temperature at which said switching means is operated, a projection on said wedge member for securing said switching means in its open position when said wedge member is moved to an extreme temperature position, a second wedge shaped member cooperating with said bearing means movable to move said arm to a predetermined position thereby to adjust said spring for a predetermined extreme temperature, and an operating projection on said switching means cooperating with said second wedge member so as to return said second wedge member to an ineffective position when said switching means is moved to one position by said pressure device in response to said predetermined extreme temperature.

10. A refrigerator control device comprising switching means, a pressure temperature responsive device for operating said switching means, an arm having a fixed pivot, an adjusting spring mounted between the end of said arm and said pressure device so as to oppose the movement of said pressure device in response to an increase in temperature, a bearing on the end of said arm, a wedge shaped adjustment member normally engaging said bearing so as to hold said arm in a predetermined position, said wedge shaped member being movable to vary the position of the end of said arm and thereby adjust the pressure applied by said spring and the temperature at which said switching means is operated, a projection on said wedge member for securing said switching means in its open position when said wedge member is moved to its lowest temperature position, a second wedge shaped member cooperating with said roller bearing movable to move said arm to a predetermined position thereby to adjust said spring for a predetermined defrost temperature, and an operating arm on said switching means arranged to engage said second wedge member and return said second wedge member to an ineffective position when said switching means is moved to a closed position by said pressure device in response to said predetermined defrost temperature.

11. A control device comprising an operating member, a temperature responsive device for actuating said operating member, a spring bearing on said operating member and applying a force continuously to said operating member in opposition to said temperature responsive device, a second member movable from a first position to a second position to vary the force applied by said spring to said operating member, and a projection on said operating member for engaging said second member when said operating member is moved by said temperature responsive device to compress said spring thereby to return said second member to said first position.

12. A control device comprising an operating member, a temperature responsive device for actuating said member, a spring bearing on said member and applying a force continuously to said member in opposition to said temperature responsive device, a cam movable from a first position to a second position to compress said spring and thereby increase the force applied by said spring to said operating member, and an operating projection on said operating member in position to engage said cam upon compression of said spring by said temperature responsive device thereby to return said cam to said first position.

ALAN N. AYERS.